No. 776,298. PATENTED NOV. 29, 1904.
L. A. CORNELIUS.
FAUCET COUPLING.
APPLICATION FILED OCT. 11, 1901.
NO MODEL.
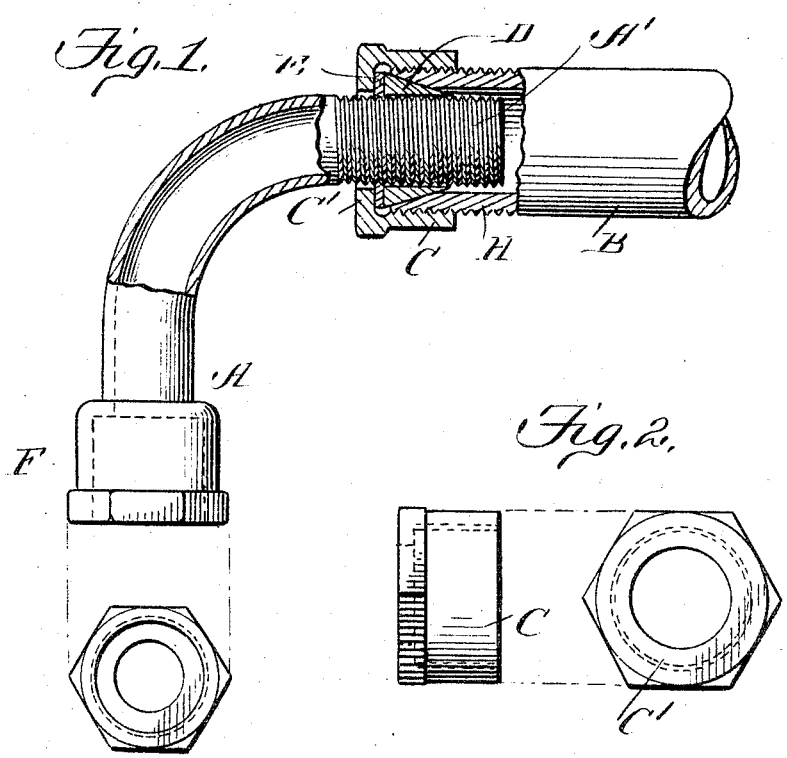
Witnesses
C. D. Kesler
Robert Everitt
Inventor
Louis A. Cornelius
By
Edward Taggart No. 776,298. Patented November 29, 1904.

UNITED STATES PATENT OFFICE.

LOUIS A. CORNELIUS, OF GRAND RAPIDS, MICHIGAN.

FAUCET-COUPLING.

SPECIFICATION forming part of Letters Patent No. 776,298, dated November 29, 1904.

Application filed October 11, 1901. Serial No. 78,395. (No model.)

*To all whom it may concern:*

Be it known that I, LOUIS A. CORNELIUS, a citizen of the United States, residing at Grand Rapids, in the county of Kent and State of Michigan, have invented new and useful Improvements in Faucet-Couplings, of which the following is a specification.

This invention relates to a new and useful faucet-coupling, and has for its object to furnish a coupling having a proper degree of adjustability, and, furthermore, to provide such a coupling having a proper degree of flexibility.

The invention has also for its object the provision of a novel, simple, yet efficient coupling for connecting together different-size tubes in a simple and convenient manner.

With these objects in view the invention consists in the features of construction and in the combination and arrangement of parts hereinafter described, and set forth in the accompanying clauses of claim.

In the accompanying drawings, illustrating my invention, Figure 1 is a side elevation of the preferred form of coupling and showing also the enlarged portion F thereof in end elevation. Fig. 2 illustrates the coupling-nut in side and also in end view. Fig. 3 shows the flexible compressible gasket in side and end view. Fig. 4 shows the metallic nut in side and end view.

In the said drawings the reference-letter A designates the coupling member, consisting of a tube of any required shape or form, the office of which is to couple a relatively fixed tube B (constituting, for instance, a pipe with which the faucet proper (not shown) is combined) and a pipe (not shown) for supplying water thereto. My invention concerns the means by which the coupling member or tube is connected with the relatively fixed faucet connection B.

As illustrated, the coupling member A is preferably provided at its end with a suitably-roughened exterior, as by means of screw-threads, (shown in the drawings at A',) and the relatively fixed member B is provided at its end with an external screw-thread H, with which an internal screw-threaded nut C engages. This nut is provided with an inwardly-projecting flange C'. The end of the relatively fixed or faucet connection B is preferably flared to provide an enlargement for the reception of the flexible compressible gasket D, as clearly shown in Fig. 1 of the drawings, and said gasket is correspondingly shaped to snugly fit the flaring seat and provide a water-tight connection when the parts are assembled.

The reference-letter E designates a metal nut, which is preferably circular in form and has an internal screw-thread adapted to engage an exterior thread A' on the coupling member A, as shown in Fig. 1.

The metal nut E may be dispensed with without departing from the spirit of the invention.

The reference-letter F designates an enlarged portion or socket connected to the coupling member A, and in the illustrated example of my invention this enlarged portion is provided with an internal thread whereby it may be connected to a supply-pipe (not shown) having a threaded portion adapted to engage therewith.

My invention is not concerned with the supply-pipe, and therefore it is not herein shown or described.

The manner in which the parts are assembled is as follows: In case the enlarged portion F is utilized the nut C is first placed upon the coupling member A. Then the nut E when used is engaged with the threaded portion of said coupling member. The gasket D is then fitted upon the end A' of the coupling member A. Preferably and as shown the gasket is placed in position by turning or screwing it onto the said coupling member A. Then the flange C is screwed upon the threaded end H of the faucet connection B and is adjusted thereon, so as to draw the coupling member A into the faucet connection B, pressing the gasket D to a close seat against the end of the faucet connection B and providing a water-tight joint. If the coupling member A be not provided with the enlarged portion F, the nut C may, if desired, be slipped over the said element A from the lower end thereof.

It will be observed that the end of the coupling element has an external diameter less than the internal diameter or the bore-diameter of the faucet connection B and is entered thereinto and when so entered is out of contact therewith and also that the flange of the nut C is free of contact with the coupling member A. These features of construction and arrangement afford a proper degree of flexibility to the coupling, whereby a water-supply pipe may be quickly and easily connected up to the faucet connection and any deviation from perfect position of alinement of said member with respect to said connection compensated for. It will be observed, furthermore, that the telescoping end of the coupling element A may be introduced to varying degrees into the bore of the faucet connection, whereby desirable adjustability is attained.

Having thus described my invention, what I claim is—

1. In pipe-joints, a tubular fixed part, a coupling member having one end of smaller cross-section than the interior of said fixed part and projecting thereinto and externally threaded on its entering portion, in combination with a compressible seat screwed upon said threaded end and engaged against the end of said fixed part, and a coupling-nut threaded upon said fixed part and having a flange in position to compress said compressible seat, said flange being entirely free about said coupling member, substantially as described.

2. In pipe-joints, a tubular fixed part, a coupling member having one end of a smaller cross-section than the interior of said fixed part and projecting thereinto and externally threaded on its entering portion, in combination with a compressible seat fitted upon said threaded end and engaged against the end of said fixed part, and a coupling-nut threaded upon said fixed part and having a flange in position to compress said compressible seat, said flange being entirely free about said coupling member, substantially as described.

3. In a faucet connection, an externally-threaded connecting-pipe, a coupling-tube having external threads and its threaded portion projecting into and being free of the connecting-pipe, a gasket surrounding said coupling-tube, and the connecting-pipe having a seat to receive said gasket, a nut in engagement with the threaded portion of the coupling-tube and abutting against said gasket, and a second nut surrounding the coupling-tube and in engagement with the threads of the connecting-pipe and abutting against said first-mentioned nut.

4. In a faucet connection, an externally-threaded connecting-pipe, a coupling-tube having external threads and its threaded portion projecting into and being free of the connecting-pipe, a gasket surrounding said coupling-tube, and the said pipe having an outwardly-flared seat to receive said gasket which is shaped to agree with its seat, a nut in engagement with the threaded portion of the coupling-tube and abutting against said gasket, and a second nut surrounding said coupling-tube and in engagement with the threads of the connecting-pipe and abutting against said other nut.

5. In pipe-joints, a tubular fixed part, a coupling member having one end of smaller cross-section than the interior of said fixed part and projecting thereinto, in combination with a compressible seat fitted upon the end of said coupling member and engaged against the end of said fixed part, and a coupling-nut threaded upon said fixed part and having a flange in position to compress said compressible seat, said flange being entirely free of said coupling member, substantially as described.

In testimony whereof I have hereunto set my hand in presence of two subscribing witnesses.

LOUIS A. CORNELIUS.

Witnesses:
ARTHUR C. DENISON,
EDWARD TAGGART.